106. COMPOSITIONS, COATING OR PLASTIC
84

1,321,085

UNITED STATES PATENT OFFICE.

HARVEY B. BOOTH, OF MONTREAL, QUEBEC, CANADA, ASSIGNOR TO A. RAMSAY AND SON COMPANY, OF MONTREAL, QUEBEC, CANADA, A CORPORATION.

CEMENT.

106-48

1,321,085.     Specification of Letters Patent.     Patented Nov. 11, 1919.

No Drawing.     Application filed November 18, 1918. Serial No. 262,985.

*To all whom it may concern:*

Be it known that I, HARVEY BRADBURY BOOTH, a subject of the King of Great Britain, and resident of Montreal, Province of Quebec, Canada, have invented certain new and useful Improvements in Cements; and I do hereby declare that the following is a full, clear, and exact description of same.

This invention relates to refractory cements and its object is to provide a cement composition more particularly adapted for use as a protective coating for the electrodes of electirc furnaces although it may be used for a variety of purposes.

Hitherto in applying protective coatings to electrodes it has been necessary to first wind the electrode with wire in order to afford a frictional surface to insure adhesion of the cement which otherwise would not properly adhere, but my improved cement composition possesses the required protective quality and is of a nature to be so affected by the heat of the electrode as to secure the necessary adhesion thereto, thus avoiding any necessity for providing the electrode with a frictional surface.

The improved cement consists of a mixture of feldspar, (which is the principal element in effecting the results aimed at), silica (in the form of an artifically crushed quartz), silica sand (in its natural form) and a solution preferably of sodium silicate, sodium sulfate and water.

In preparing the cement for use as a protective coating for electrodes the portion of feldspar depends upon the degree of heat to be supplied by the electrodes, a variation within certain limits being desirable according to the different degrees of heat, a larger quantity being used where a lower degree of heat is to be considered and a smaller quantity with respect to a relatively higher temperature.

The limit of variation in the proportion of feldspar is practically between 15 and 40 per cent. of the mixture and the undermentioned examples of the latter have been found to be effective.

For an electrode supplying a heat of say, 3000 degrees Fahr. it is advisable to use a protective coating such as would be produced by a mixture containing the minimum quantity of feldspar as follows:

| | Per cent. |
|---|---|
| Feldspar | 15 |
| Silica | 40 |
| Silica sand | 15 |
| With a solution comprising sodium silicate (92 parts), sodium sulfate (8 parts) and water | 30 |

For an electrode supplying a heat of say 1500 degrees Fahr. the following mixture would be effective:

| | Per cent. |
|---|---|
| Feldspar | 40 |
| Silica | 20 |
| Silica sand | 15 |
| With a solution of sodium silicate (92 parts), sodium sulfate (8 parts) and water | 25 |

The function of the feldspar is to effect the required fusing between the coating and the electrode, the silica and silica sand acting to produce a hardening effect and also to increase the resistance, while the solution of sodium silicate and sodium sulfate acts as a binder for the whole.

What I claim is as follows:

1. A protective coating for bodies subjected to high temperatures, consisting of a mixture comprising feldspar, silica in the form of crushed sharp-edged quartz, silica sand in its natural form and a binder, adapted to be applied to said bodies and caused to adhere thereto by the heating of said bodies.

2. A protective coating for bodies subjected to high temperatures, consisting of a mixture comprising feldspar, silica, in the form of crushed sharp-edged quartz, silica sand in its natural form and a solution of sodium silicate and sodium sulfate, adapted to be applied to said bodies and caused to adhere thereto by the heating of said bodies.

3. A cement mixture comprising 15 to 40 per cent. of feldspar, silica in the form of crushed sharp-edged quartz, silica sand in its natural form and a binder.

4. A protective coating for furnace electrodes consisting of a mixture comprising feldspar, silica in the form of crushed sharp-edged quartz, silica sand in its natural form and a binder, the proportion of feldspar being such as to insure a fusing action between the mixture and the electrode upon the heating of the latter.

In testimony whereof, I have signed my name to this specification, in the presence of two subscribing witnesses:

HARVEY B. BOOTH.

Witnesses:
FRED J. GEAV,
A. R. EVANS.